April 2, 1940.  F. MALLGRAF  2,195,575

FEEDING DEVICE FOR BIRDS

Original Filed Feb. 25, 1935   3 Sheets-Sheet 1

INVENTOR.
FERDINAND MALLGRAF
BY
*Ebert R Brouwer*
his ATTORNEY.

April 2, 1940. F. MALLGRAF 2,195,575
FEEDING DEVICE FOR BIRDS
Original Filed Feb. 25, 1935 3 Sheets-Sheet 2
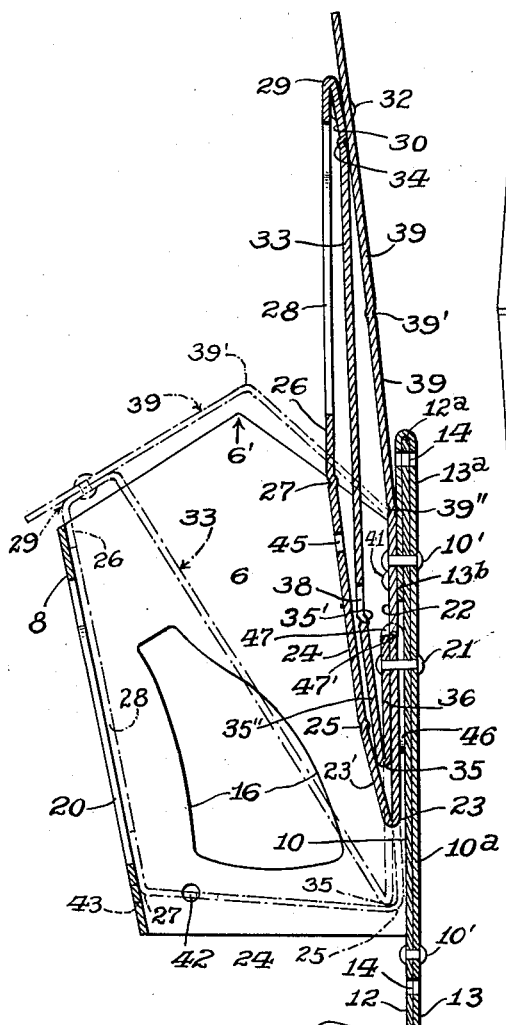
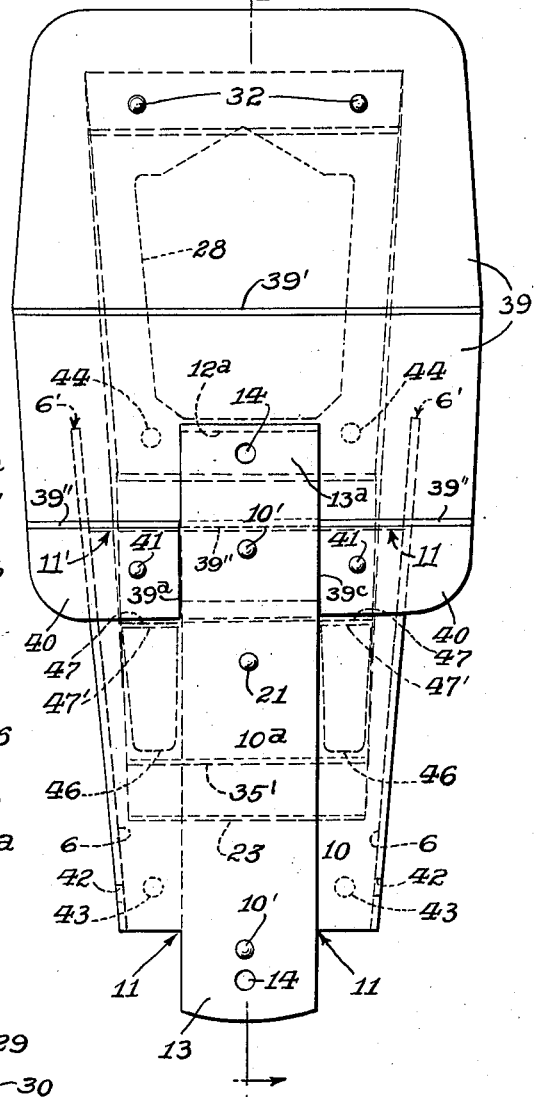
INVENTOR.
FERDINAND MALLGRAF April 2, 1940.  F. MALLGRAF  2,195,575
FEEDING DEVICE FOR BIRDS
Original Filed Feb. 25, 1935   3 Sheets-Sheet 3
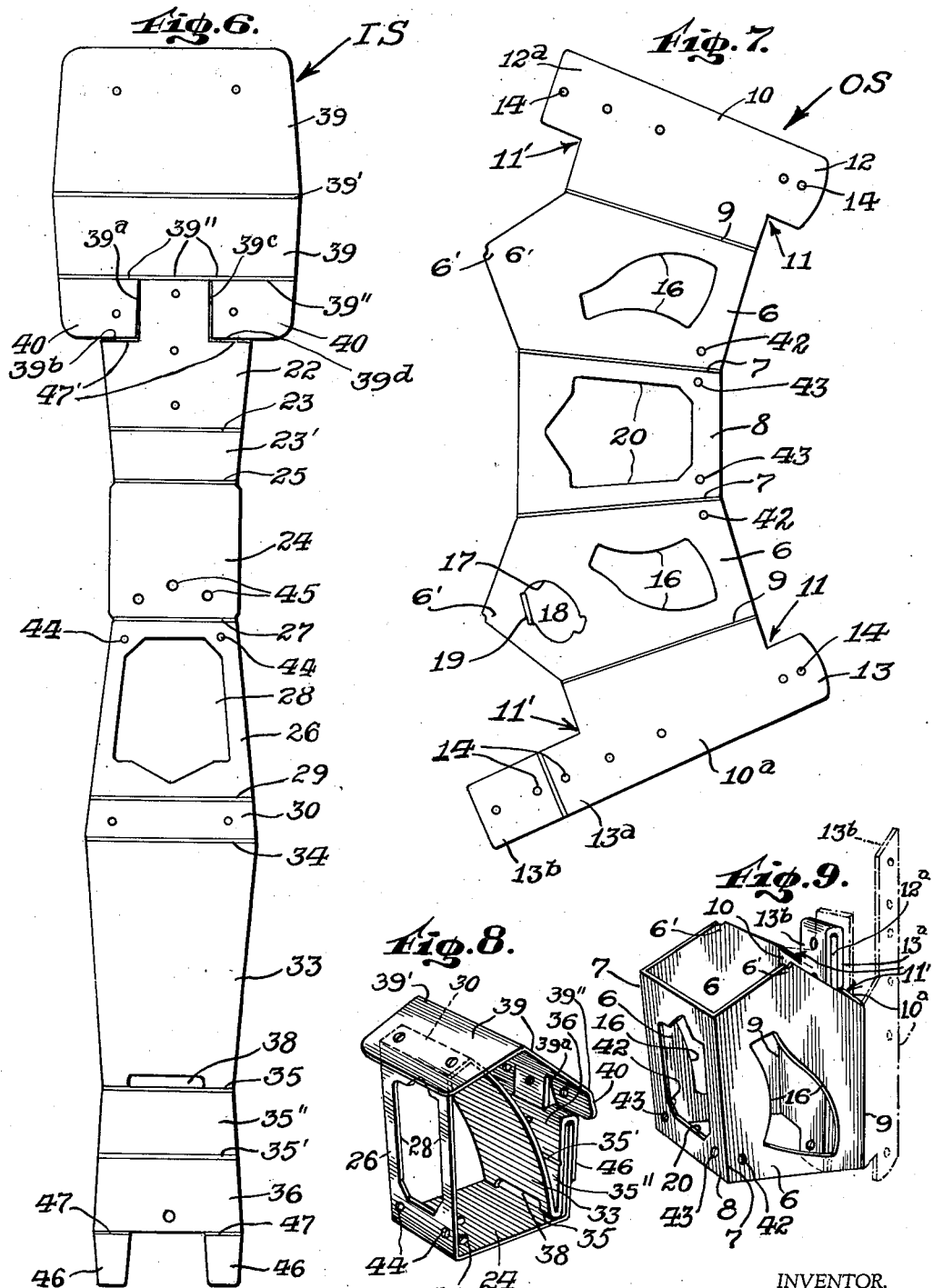
INVENTOR.
FERDINAND MALLGRAF
BY
Elbert R. Broumer
his ATTORNEY.

Patented Apr. 2, 1940

2,195,575

UNITED STATES PATENT OFFICE 2,195,575

FEEDING DEVICE FOR BIRDS

Ferdinand Mallgraf, Little Neck, N. Y.

Substitute for abandoned application Serial No. 8,125, February 25, 1935. This application December 17, 1938, Serial No. 246,461

7 Claims. (Cl. 119—52)

My present invention relates to improvements in feeding devices for birds.

This application is filed as a substitute for my previous application bearing Serial No. 8,125 and filed February 25, 1935.

One of the principal general objects of the invention is to provide a feeding device for birds, resembling a bird house, and provided in several of its walls with openings through which the birds may obtain the food which gravitates onto the bottom of the device from a hopper, which is sheltered by the roof of the device and closed at its sides by the side walls of the device, one of which is provided with a covered opening through which food may be placed into the hopper to replenish the supply.

Another object of the invention is to provide a device of the above character composed of a plurality of hingedly connected panels foldable with respect to each other, whereby the device may be collapsed into substantially flat or compact form, and extended to house-like form, and if desired held in such extended position by perches arranged adjacent the openings through which the birds obtain the food dispensed therethrough, so that the birds may stand thereon when feeding.

The foregoing and all of the objects and advantages of the invention will be pointed out during the course of the following detailed description of the accompanying drawings, in which:

Figure 3 is a central vertical sectional view on line 3—3 of

Figure 2:
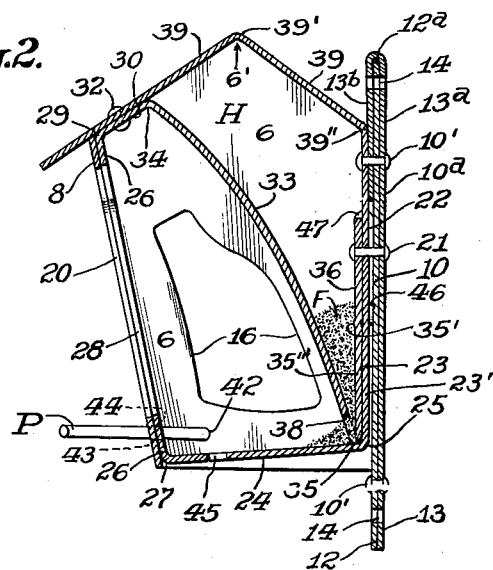
Figure 2 is a central vertical sectional view through the device of Figure 1.

Figure 4, similar to Figure 2, showing the hopper forming part of the device in collapsed position in full lines, and partly extended position as indicated in dot and dash lines.

Figure 4 is a rear view of the structure partially extended, and with the roof elevated.

Figure 5 is a perspective view of the device in collapsed or flat condition.

Figures 6 and 7 are plan views of the separate cut blanks of the hopper and outer house structure strips, respectively.

Figure 1:
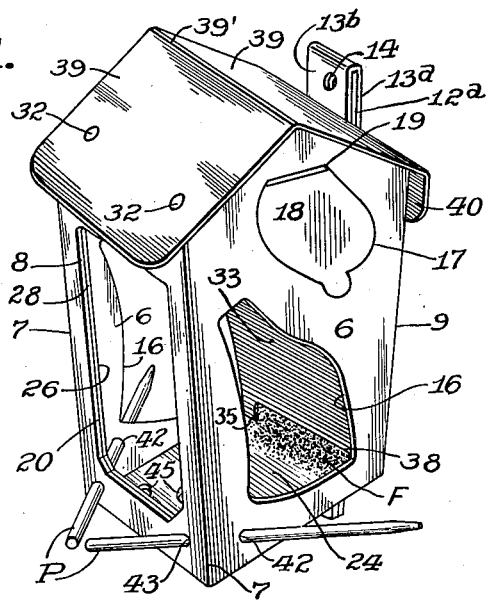
Figure 1 is a perspective view of a feeding device embodying the present invention.

Figures 8 and 9 are views in perspective of the blank strips shown in Figures 6 and 7, folded and extended in their separate assembled form in which the hopper form of Figure 8 is inserted and telescoped into and secured to the outer house structure form of Figure 9, thereby completing the integral house structure shown in Figures 1 and 2.

In the drawings, the numeral 6 designates the sides of the device connected along creases 7 to the front panel 8, and by similar creases 9 to the rear end panels or flaps 10 and 10$^a$. The sides 6, front 8, and rear end panels 10 and 10$^a$, are preferably integral parts of a foldable sheet of material, such as cardboard, fibre-board, or the like, and the rear panel of the assembled house structure is formed by the end panels 10 and 10$^a$ and 13$^b$ of the outer collapsible or extended strip OS, which are secured together by rivets 10'. The ends 10 and 10$^a$ of this strip from which rear panel 10 is formed are notched as at 11 and 11' at the corners of the panel to form tabs 12, 12$^a$, 13 and 13$^a$ with extension 13$^b$, which are provided with openings 14 to receive nails or the like to secure the device to a support.

The side panels 6 are provided with openings 16, which may be of any desired shape or dimension, so long as they are not so large as to expose a portion of the hopper H hereinafter described. One of the sides 6 is also provided with an opening 17 closed by tab or cover 18 which may be partly cut out from the side and creased as at 19 to provide a hinge, whereby the opening 17 may be exposed to permit food to be placed in the hopper or covered to protect the food against rain and snow. The front panel 8 is also provided with a relatively large opening 20.

The bottom, front wall of the hopper, and supplemental front wall of the inner collapsible or extended strip IS of the device, may be formed from continuous strip or sheet of material corresponding in width to the distance between the walls 6. A rivet 21 is secured through the ends 10 and 10$^a$ of the rear panel portion of the outer house structure, and through the end panel 36 and panel 22 of the strip from which are formed the hopper, bottom, supplemental front wall, and roof of the device. One panel of the said strip as designated by the numeral 22, is disposed against the back panel 10. Panel 22 is creased at 23 thence connecting to a short panel 23' joined to the bottom panel 24 along a crease 25. The bottom panel 24 is joined to the supplemental front panel 26 by a crease 27, and the supplemental front panel 26 is provided with an opening 28 preferably of the same dimension and configuration as the opening 20 in the front panel 8, so that the said openings will register when the house is extended. At its top the supplemental front panel 26 is creased at 29 joining it to a short panel 30 of the strip which is riveted to the roof as indicated at 32. A relatively long panel 33 is joined to the short panel 30 along crease 34, and at its bottom the panel 33 is joined along crease 35 to short panel 35'' which is connected by a crease 35' to one end 36 of the strip, which is secured against the end panels 10, 10ᵃ and panel 22 by the rivet 21, as hereinbefore described. Adjacent to or along the crease 35 the panel 33 is cut out to provide an elongated opening 38 through which the food from the hopper H may gravitate onto the bottom floor panel 24.

The roof 39 is wider than the walls of the device and extends laterally therebeyond, and is creased at its center as indicated by numeral 39' to fold over apexes 6' of side walls 6. The roof also extends beyond the front panel 8 when the device is extended. The roof 39 is connected to panel 22 along crease 39'' and has below crease 39'' a portion cut out at 39ᵃ, 39ᵇ, 39ᶜ and 39ᵈ to provide two corner pieces 40 straddling the attaching tab 12ᵃ, tab 13ᵃ, and extension 13ᵇ, and notches 11'. The ends or corner pieces 40 are shown secured to the rear end panels 10 and 10ᵃ by rivets 41. As previously explained the roof is hingedly connected adjacent the front panel 26 and panel 30, from which diverges the panel 33 to form the front wall of the hopper H.

The side panels 6 are provided in their lower corners with openings 42, while the front panel 8 is provided with similar openings 43, and supplemental front panel 26 is provided with openings 44 which register with the openings 43 when the structure is extended.

As shown best in Figures 2, 3 and 4, the upper portion of panel 22, which is joined to the roof is reduced in width at its center so that tabs 46 on the end of part 36 may be folded over the shoulders 47' on the panel 22 at opposite sides of the reduced portion, as indicated at 47, to facilitate assembly, the tabs being held between panels 22, 10 and 10ᵃ, while rivet 21 is being applied.

As will be pointed out presently, the panel 33 is preferably of a length such that when the device is extended the panel 33 will be arched when the crease 35 engages the crease 25, and the roof 31 is down against the top edge of front panel 8, as shown in Figure 2. It will be understood, of course, that the side edges of the panel 33 snugly engage the inner surfaces of the side walls 6, so that food cannot escape from the hopper H except through the opening 38. Further, when the device is in extended position, the panel 33 is above or beyond the opening 16.

With the foregoing in mind, and assuming that the device is furnished in the collapsed form of Figure 5, with the panels 6 and 8 of one strip folded flatly in one direction and with the panels 39, 33, 24, folded flatly in another direction at right angles to the first strip, to extend the device it is simply necessary to move the panels 6 outwardly away from each other to the position shown in Figures 3 and 4, which disposes the panel 8 in spaced relation to the back panel 10 forming a tubular-like structure, as shown in Figure 3. To complete extending of the device, and referring to Figure 3, the roof 31 is pulled down, which movement swings the supplemental front panel 26 toward the front panel 8 and the bottom panel 24 toward the lower end of the tubular or tubular-like structure. These movements also cause the panel 33 to move into a position diagonally between the top front and rear bottom of the structure. The nearly closed position of the structure is shown in Figure 3 in dot and dash lines, and when the roof is further depressed the panel 33 is arched and bent inwardly between creases 34 and 35, due to the excessive length of the panel 33, as shown in Figure 2. To hold the device in said extended position, I preferably insert the perches P through openings 43, 44 and 42, each perch extending diagonally between the front and a side of the structure and adjacent the openings 16 and 20 through which the birds obtain the food. The hopper H is formed by the roof panels 39, rear panels 36 and 35'' and the panel 33 having the elongated opening 38 adjacent the floor panel 24 of the strip IS, and by the side panels 6 of the strip OS, the grain or other food which is placed in the hopper through the opening 17 gravitates through the opening 38 onto the bottom 24 as it is consumed by the birds. Preferably the bottom 24 slopes forwardly and downwardly, as shown in Figure 2, to provide drainage in case water gets into the device as during a rain. I may also provide drain openings 45 in the bottom for the escape of the water.

From the foregoing, it should be obvious that a collapsible feeding device for birds may be provided from relatively cheap material, preferably impregnated or coated with weather-proofing compositions, and may be furnished in flat form, easily extended, maintained in extended position, and secured in place on any support.

Having thus described my invention, what I claim as new and desire to secure by Letters Patent, is as follows:

1. A collapsible feeding device for birds comprising a house-like structure including front, back and side walls interconnected for swinging movement to form a tubular-like structure, certain of said walls having openings through which birds may have access to the food, top and bottom panels swingably connected to the rear wall, a third panel connected to the top panel adjacent its front and extending diagonally down across the structure to a point adjacent the rear of the bottom panel when the structure is extended to provide a hopper to hold the food, and an opening between said third panel and bottom to permit the food to gravitate from the hopper onto the bottom.

2. A collapsible feeding device for birds comprising a house-like structure including front, side and back walls hingedly connected and movable to extended position to form a four wall structure, a top hingedly connected to one of said walls and movable to close one end of said structure, a bottom hingedly connected to said one wall and movable to close the other end of said structure, and a supplemental panel connected to the top and hingedly connected to said one wall and movable when said top and bottom are moved to close said ends to form a partition in said structure forming in connection with certain of said walls a hopper to receive food, certain of said walls having openings on the outside of the hopper to afford access to the interior of the structure, and said hopper having an opening in its bottom to permit food to gravitate onto the said bottom of the structure.

3. A collapsible feeding device for birds comprising a house-like structure including front, side and back walls hingedly connected and movable to extended position to form a four wall structure, certain of said walls having openings therein through which the birds may obtain the food, a top hingedly connected to one of said walls and movable to close one end of said structure, a bottom hingedly connected to said one wall and movable to close the other end of said structure, and a supplemental panel connected to the top and hingedly connected to said one wall and movable with said top and bottom when they are moved to close said ends to form a partition diagonally across said structure, said supplemental panel being of a length greater than the distance between the point at which it is secured to the top and the point to which it extends adjacent the bottom whereby it will be arched inwardly above the openings in said walls to form a hopper with certain of said walls and the top, and an opening provided adjacent the bottom of said supplemental panel through which food may gravitate onto the bottom of the structure.

4. A collapsible feeding device for birds comprising a house-like structure including front, side and back walls hingedly connected and movable to extended position to form a tubular four wall structure, certain of said walls having openings therein through which the birds may obtain the food, a top hingedly connected to one of said walls and movable to close one end of said structure, a bottom hingedly connected to said one wall and movable to close the other end of said structure, and a supplemental panel connected to the top and hingedly connected to said one wall and movable with said top and bottom when they are moved close to said ends to form a partition diagonally across said structure, said supplemental panel being of a length greater than the distance between the point at which it is secured to the top and the point to which it extends adjacent the bottom whereby it will be arched inwardly above the openings in said walls to form a hopper with certain of said walls and the top, and an opening provided adjacent the bottom of said supplemental panel through which food may gravitate onto the bottom of the structure, and perches mounted through certain walls of said structure when the device is extended to hold it in said extended position, said perches projecting to positions below and adjacent said openings.

5. A collapsible feeding device for birds comprising a house-like structure including front, side and back panels hingedly connected and movable to extended position to form a tubular-like four wall structure, at least one of said panels having an opening through which birds may obtain food, a top hingedly connected to one of said panels and movable to close one end of the tubular structure, a bottom hingedly connected to said one of the panels and movable to close the other end of the structure, a supplemental panel connected to said top and bottom and movable collectively therewith, and a partition hingedly connected to the top adjacent its front and hingedly carried by the back and movable into a position diagonally between the top and bottom when the structure is extended to form in connection with the side and back walls of the structure a hopper to contain the food, said partition having an opening through which food may gravitate from the hopper onto the bottom.

6. A feeding device for birds, comprising separate blank strips, one of said strips extended into a hopper form, the other strip extended into a house structure form, said hopper form being adaptable to be inserted into and secured to said house structure form, said hopper form including a roof panel, a floor panel, and a relatively long panel secured to extend between the front of the roof panel and the rear of the floor panel, large openings provided in the walls of said house structure form adjacent said relatively long panel, an elongated opening provided in the lower end of said relatively long panel adjacent the said floor panel so that the food placed into the hopper form gravitates through said elongated opening onto the floor panel whereby the birds may consume food through said large openings.

7. A feeding device for birds, comprising cut blank strips separately extended into hopper and house structure forms, said hopper form including parts which, when inserted into the house structure form, produce a roof, a floor, and a hopper structure, said hopper having an opening near the floor whereby food placed in the hopper is distributed on said floor, large openings provided in the walls of said house whereby the birds may consume the food through said large openings, said assembled house structure being adaptable to be folded into a collapsible compact form, and means to lock said hopper and house structure forms when extended into their assembled house structure.

FERDINAND MALLGRAF.